United States Patent [19]

Namiki et al.

[11] 4,395,139

[45] Jul. 26, 1983

[54] TEMPERATURE DETECTING DEVICE

[75] Inventors: Masayuki Namiki; Masaaki Kamiya; Yoshikazu Kojima; Kojiro Tanaka, all of Tokyo, Japan

[73] Assignee: Kabushiki Kaisha Daini Seikosha, Tokyo, Japan

[21] Appl. No.: 236,492

[22] Filed: Feb. 20, 1981

[30] Foreign Application Priority Data

Mar. 14, 1980 [JP] Japan .................................. 55-32215

[51] Int. Cl.³ ............................................ G01K 7/00
[52] U.S. Cl. .................................. 374/178; 364/557; 374/183
[58] Field of Search ..................... 73/362 AR, 362 SC; 364/557; 374/178, 183

[56] References Cited

U.S. PATENT DOCUMENTS

| 2,071,946 | 9/1981 | Namiki et al. | 374/178 |
| 3,956,966 | 5/1976 | French | 73/362 SC |
| 4,165,642 | 8/1979 | Lipp | 364/557 |
| 4,305,288 | 12/1981 | Morris | 73/362 SC |

OTHER PUBLICATIONS

*Integrated Circuit Temperature Controller*, Brian Dance, Australian Electronics Engineering, vol. 9, #4, Apr. 1976, pp. 36-37.

*Primary Examiner*—Steven L. Stephan
*Attorney, Agent, or Firm*—Robert E. Burns; Emmanuel J. Lobato; Bruce L. Adams

[57] ABSTRACT

A temperature detecting device comprises a semiconductor diode temperature sensor having a resistance characteristic which varies with variations in temperature, and a constant current circuit connected in series. A power source is connected in parallel with the series circuit and connected in parallel with a constant voltage circuit. A resistance ladder circuit is connected between an output terminal of the constant voltage circuit and one terminal of the power source, and an output terminal of the resistance ladder circuit is connected to a first input terminal of a differential amplifier. A second input terminal of the differential amplifier is connected to a connection point of the semiconductor diode and the constant current circuit. In operation, the voltage drops across cumulatively successive resistors of the resistance ladder circuit are compared with the voltage drop across the semiconductor diode temperature sensor by the differential amplifier and in response to a favorable comparison, the output logic state of the differential amplifier changes to thereby provide an output temperature signal.

10 Claims, 5 Drawing Figures

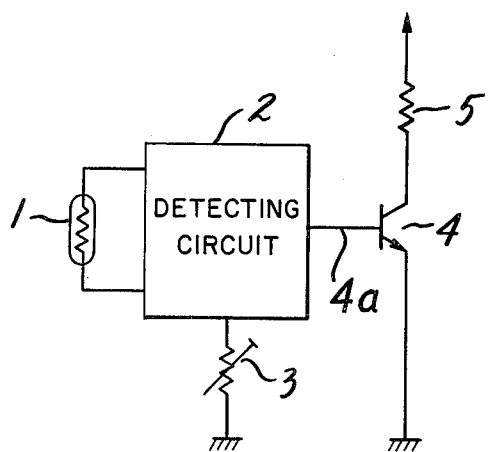
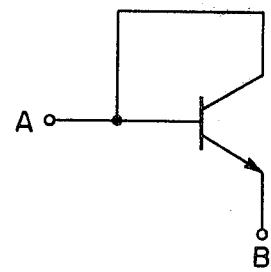
FIG. 1
FIG. 3
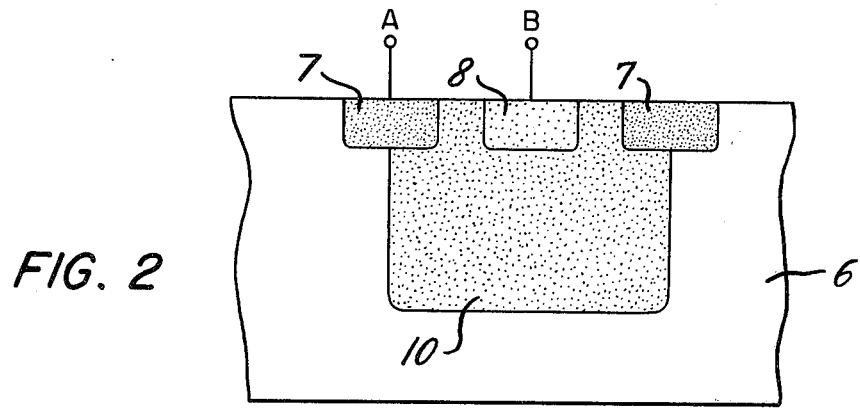
FIG. 2
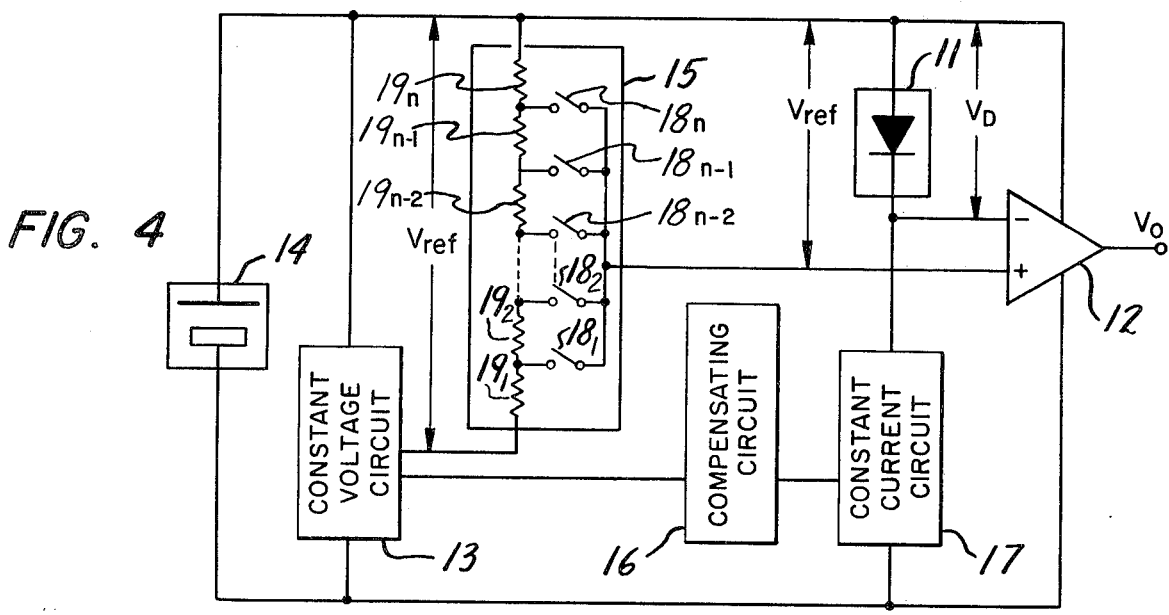
FIG. 4

TEMPERATURE DETECTING DEVICE

BACKGROUND OF THE INVENTION

The present invention relates to a temperature detecting device.

An object of the present invention is to provide a highly accurate and inexpensive element for detecting a predetermined temperature and which can be easily fabricated on a semiconductor substrate.

The conventional temperature detecting/controlling system is arranged, for example, as shown in FIG. 1.

The principle of operation of the FIG. 1 system is that the change of the resistance value of a thermistor 1 due to a change of temperature is detected by a resistance value detecting circuit 2, and a driving transistor 4 is turned on or off in accordance with a signal from a control output terminal 4a to control the heating operation of a heater 5. The disadvantages of such a system are as follows:

1. The reliability is relatively low due to deterioration of the thermistor.
2. It is necessary to adjust an adjusting resistor 3 for every thermistor element in such a way that the detecting operation is done at a predetermined temperature because of the large dispersion characteristic of thermistors.
3. A large number of separate parts and a large space are required, the cost of manufacture is high and the reliability is not good.

Therefore, there presently is the need for a temperature detecting device which can be operated in a stable and accurate manner, and which can be easily fabricated on a common substrate at low cost.

The present invention provides a low cost and high reliability device for detecting temperature in which the above mentioned disadvantages are effectively eliminated.

One object of the present invention is to utilize the temperature dependency of forward current of a diode fabricated on a semiconductor as a temperature sensor and to fabricate the temperature detecting device as a monolithic structure.

Another object of the present invention is to provide a voltage measuring circuit capable of detecting the voltage change produced across a diode temperature sensor and which is fabricated on a single substrate to reduce both cost and space.

A further object of the present invention is to provide a circuit for compensating for the dispersion of voltage of a constant voltage measuring circuit and which operates at high accuracy.

The present invention will be described in detail in conjunction with the drawings.

Before describing the present invention, in order to explain one example of a temperature sensor using a diode, an equivalent diode using a silicon NPN junction transistor will first be described. FIG. 2 illustrates a sectional view thereof and FIG. 3 illustrates an equivalent circuit thereof. A base contact P+ region 7 and an emitter N+ region 8 are formed in a P well 10 on an N type silicon substrate 6. When the base contact 7 is connected to the collector 6 and a voltage V is applied across a base terminal A and an emitter terminal B, the current I flowing between the emitter 8 and the collector 6 will be expressed as follows in accordance with the standard theory of transistor operation:

$$I = S \cdot q \cdot \frac{D}{W - X_j} \cdot \frac{n_i^2}{N_A} \cdot exP\left(\frac{qV}{nkT}\right) \quad (1)$$

in which
S: emitter - base junction area;
q: unit charge;
D: diffusion constant of minority carriers;
W: depth of the base (P - well);
$X_j$: depth of the emitter (N+ region);
$n_i$: intrinsic carrier density;
$N_A$: impurity density of the base (P - well);
k: Boltzmann's constant;
T: temperature;
In addition, $n_i$ and D are as follows:

$$n_i = 1.5 \times 10^{33} T^3 \, exP\left(\frac{-1.21q}{kT}\right) \quad (2)$$

$$D = \frac{kT}{q} \mu = \frac{kT}{q} \mu_0 \left(\frac{T}{T_0}\right)^{-2.5} \quad (3)$$

A temperature coefficient dV/dT of the voltage across the diode is as follows:

$$\frac{dV}{dT} = -n\frac{k}{q}\left(\ln S - \ln N_A - \ln I - \frac{1}{2}\ln T - 0.5 + \ln C\right) \quad (4)$$

The equation (4) shows that the temperature coefficient of a diode temperature sensor, illustrated as an equivalent circuit in FIG. 3, is a function of the base concentration $N_A$ and the emitter current density I/S. Therefore, it is possible to quantitatively discuss the dependency of base concentration of temperature coefficient of a silicon planar junction diode temperature sensor shown as an example in FIG. 2. For example, when the base impurity density is $5 \times 10^{10}$ atom/cm³, a constant current I is about 0.1 µA and the emitter-base junction area is 100 µm × 100 µm, the temperature coefficient will be about 2.8 mV/°C. The dispersion for temperature is small when it is used as a sensor, and it will be within ±0.2° C. Although the temperature coefficient is one-fifth that of a thermistor, it has an advantage that it can be fabricated on the same chip in a similar way together with another circuit.

BRIEF EXPLANATION OF THE DRAWINGS:

FIG. 1 is a circuit diagram showing a conventional temperature detector;

FIG. 2 is a sectional view of one example of a silicon junction diode temperature sensor;

FIG. 3 is an equivalent circuit of a silicon junction diode;

FIG. 4 is a block diagram of a temperature detecting device of the present invention.

FIG. 4 illustrates a block diagram of the present invention. A constant current circuit 17 is connected to a diode temperature sensor 11 in series to enable constant current to flow. The allowable range for the constant current flowing through the diode, is such that a constant voltage can be produced across the diode even if the source voltage is changed, and it is not always necessary to be constant for the temperature change. The reference numeral 14 designates a d.c. voltage source, such as a battery or the like, and 13 designates a constant voltage circuit. The voltage $V_D$ across the diode is not affected by the change of the power source voltage as long as a constant current of more than a certain level is flowing through the diode. The reference voltage of an A-D converter should not be changed by the change of the power source voltage. The output from the constant voltage circuit 13 is applied to an input of a resistance ladder circuit 15 of the A-D converter. The circuit 15 comprises a sequence of serially connected resistors $19_1, 19_2 \ldots 19_n$ (such as diffusion resistors), and a set of switches $18_1, 18_2 \ldots 18_n$ (such as switching MOS transistors connected as shown in FIG. 4. The temperature detecting operation is carried out by flowing a constant current through the diode temperature sensor 11 from the constant current circuit 17, applying the drop $V_D$ across voltage caused the diode sensor by the current flow therethrough to one input terminal of a differential amplifier 12, applying the output voltage $V_{REF}$ of the constant voltage circuit 13 to one terminal of the resistance ladder circuit 15, and applying the output voltage $V_{REF}$ from the resistance ladder circuit 15 to the other input terminal of the differential amplifier 12 as a comparing reference voltage $V_{REF}$ for the voltage $V_D$ across the diode 11. The sequential ON/OFF operation of the switching transistors 18 of the resistance ladder circuit 15 is continued until both input voltages fed to the amplifier 12 are coincident to thereby reverse the output level of the differential amplifier. That is, a sequential comparative type A/D converter is formed. To carry out temperature detection, the switches 18 are initially all in the open state. The switch $18_1$ is first closed while the remaining switches remain open. The voltage drop across the resistor $19_1$ corresponds to $V_{REF}$ and if equal to $V_D$, the output $V_o$ of the differential amplifier 12 will be inverted from the "low" to the "high" logic state thereby providing a temperature signal denoting the detected temperature. If the closing of the switch $18_1$ does not cause the output $V_o$ to be inverted, then the switch $18_1$ is opened and the next switch $18_2$ is closed, and so on in sequence until the output $V_o$ is inverted. The particular switch which, when closed, causes the output $V_o$ to be inverted represents the detected temperature and corresponds to the resistance of the diode temperature sensor 11 as determined by the resistance ladder circuit 15. Therefore, it follows that the detected temperature corresponds to the number of stages of the switches 18 in the resistance ladder circuit 15. In the example described above, since the temperature coefficient of the diode temperature sensor 11 is approximately 2.8 mV/°C., the constant voltage circuit 13 with an accuracy of 2.8 mV is required in order to attain an accuracy of 1° C. One example of a high accuracy constant voltage circuit which satisfies the above-mentioned accuracy requirement comprises an arrangement of C-MOS elements such as shown in FIG. 5 as the constant voltage circuit 13. The output voltage of the constant voltage circuit 13 is expressed by the following equation.

Figure 5:
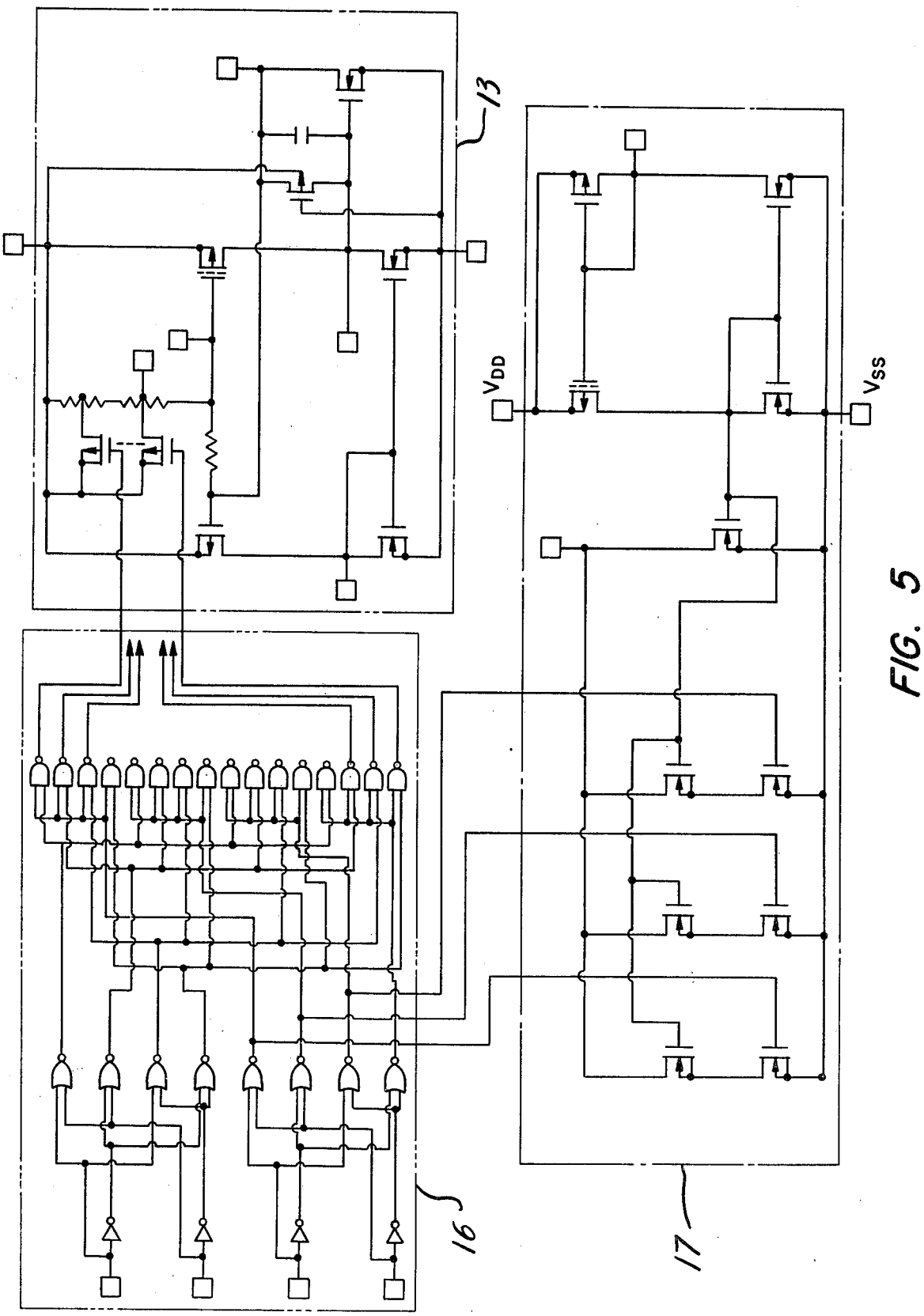
FIG. 5 is a detailed circuit diagram showing a constant current circuit, a constant voltage circuit and a circuit for simultaneously compensating the dispersions of the constant current and voltage circuits which are used in the present invention.

$$V_{ref} = \frac{V_{TPH} - V_{TPL}}{1 - \alpha}, \quad (5)$$

wherein, $$\alpha = \frac{R_1}{R_1 + R_2}. \quad (6)$$

The references used in FIG. 5 designate corresponding blocks in FIG. 4, respectively.

An example of a C-MOS constant current circuit 17 for supplying a constant current to the diode temperature sensor 11 is shown in FIG. 5 as the constant current circuit 17. The value of the constant current $I_c$ can be determined by the following equation.

$$I_c = A(K)[V_{TPH} - V_{TPL}]^2 \quad (7)$$

wherein, $A(K)$ is a known constant indicative of the carrier mobility. Thus, the constant voltage is determined by the use of the equation (5) and the constant current is determined by the use of the equation (7). In the circuit embodiment of the present invention, the constant voltage $V_{ref}$ and the constant current $I_c$ depend upon the value ($V_{TPH} - V_{TPL}$) which is the difference in the threshold level between two P channel transistors. Since the constant voltage $V_{ref}$ and the constant current $I_c$ are determined in accordance with the difference between two kinds of threshold level in the P-MOS transistor fabricated by a double channel doping technique, the accuracy of the amount of injected ions (approximately 5%) necessarily affects the fabricating dispersion of the device.

In order to increase the accuracy by compensating for the dispersion of the value ($V_{TPH} - V_{TPL}$) in the constant voltage source and the constant current source, a circuit using a non-volatile memory such as the compensating circuit 16 shown in FIG. 5 is used. For example, when four non-volatile memories are used, both dispersion of the constant voltage and the constant current may be decreased to be $\frac{1}{2}^4$. A fuse element can be used as the non-volatile memory, however, FAMOS, MNOS or the like, which are well known non-volatile memory elements, are also useable. The advantageous feature of these systems resides in the fact that both dispersion of the constant voltage source and the constant current source can be adjusted at the time of the IC inspection step or the IC assembly step, and at the same time, the dispersion of the off-set voltage of the differential amplifier in the A/D converter and the diffusion resistance of the resistance ladder circuit, which affects the temperature detecting accuracy, can be compensated by the memory.

As described above in detail, according to the present invention, since the temperature detecting device is arranged on a single semiconductor chip, the device has the advantages of stability, high reliability and low cost of fabrication.

The present invention is applicable, of course, for a usual thermometer, and moreover, for a clinical thermometer in which a high accuracy is required, for a temperature detecting control device of an air conditioner or the like, in which a thermistor is used as a sensor, for a constant temperature bath for a crystal oscillator, electric blanket and so on. As described above, the present invention has wide application in both the industrial field and the consumer electronics field.

We claim:

1. A temperature detecting device comprising: a constant voltage circuit and a series circuit of a temperature detecting means and a constant current circuit connected to a power source in parallel, a resistance ladder circuit connected between an output terminal of said constant voltage circuit and one terminal of said power source, means connecting an output terminal of said resistance ladder circuit to a first input terminal of a differential amplifier, and means connecting a second input terminal of said differential amplifier to a connection point of said temperature detecting means and the constant current circuit, whereby a temperature signal is produced as an output voltage of said differential amplifier.

2. A temperature detecting device as claimed in claim 1, wherein said temperature detecting means includes a semiconductor diode.

3. A temperature detecting device as claimed in claim 1 or 2, wherein said constant voltage circuit, said temperature detecting means, said constant current circuit, said resistance ladder circuit and said differential amplifier are formed on the same substrate.

4. A temperature detecting device as claimd in claim 1 or 2, further comprising circuit means for simultaneously compensating both dispersion of said constant current circuit and said constant voltage circuit and being connected between said constant voltage circuit and said constant current circuit.

5. A temperature detecting device for detecting temperature comprising: temperature detecting means having a resistance characteristic which varies with variations in temperature; constant current circuit means for flowing a constant current through the temperature detecting means to develop a voltage drop thereacross representative of the temperature to be detected; and electric circuit means for sequentially comparing the voltage drop across the temperature detecting means with a plurality of predetermined reference voltage drops each of which corresponds to a different known temperature and producing an output temperature signal in response to a favorable comparison.

6. A temperature detecting device according to claim 5; wherein the electric circuit means comprises a resistance ladder circuit comprised of a plurality of resistors of known resistance connected one after the other in series, means for applying a constant voltage across the resistance ladder circuit to cause current to flow therethrough, comparing means for comparing the voltage drop across the temperature detecting means with a reference voltage drop and producing an output temperature signal in response to a favorable comparison, and switching means for sequentially switching the voltage drop across cumulatively successive resistors of the resistance ladder circuit and applying the switched voltage drop as a reference voltage drop to the comparing means.

7. A temperature detecting device according to claim 5 or 6; wherein the temperature detecting means comprises a semiconductor diode having a resistance characteristic which varies with variations in temperature.

8. A temperature detecting device according to claim 7; wherein the temperature detecting means, the constant current circuit means and the electric circuit means comprise integrated circuitry fabricated on a single semiconductor chip.

9. A temperature detecting device according to claim 8; wherein the comparing means comprises a differential amplifier having two input terminals and an output terminal, means connecting one input terminal to a connection point of the temperature detecting means and the constant current circuit means, and means connecting the other input terminal to an output terminal of the electric circuit means.

10. A temperature detecting device according to claim 7; further including compensating circuit means for compensating for dispersion of the constant current circuit means.

* * * * *